Nov. 3, 1964

T. H. EDMUNSON 3,155,129

CHAIN SAW TOOTH

Filed May 21, 1962

INVENTOR.
TILLSON H. EDMUNSON
BY
Knox & Knox

Nov. 3, 1964

T. H. EDMUNSON 3,155,129

CHAIN SAW TOOTH

Filed May 21, 1962

*INVENTOR.*
TILLSON H. EDMUNSON

BY Knox & Knox

United States Patent Office 3,155,129
Patented Nov. 3, 1964

3,155,129
CHAIN SAW TOOTH
Tillson H. Edmunson, 1151 Concord, El Cajon, Calif.
Filed May 21, 1962, Ser. No. 196,219
2 Claims. (Cl. 143—135)

The present invention relates generally to cutting tools and more particularly to kerf splitter saw chain teeth.

Conventional saw chains use multiple cutting teeth spaced along a flexible link type chain, the teeth extending on alternate sides of the chain to make a cut, substantially wider than the chain. Various types of teeth and cutting edge configurations have been used, but a major problem with chain saws is the vibration caused by the chain jumping from side to side as the teeth tend to gouge laterally into the wood. In addition, since each tooth actually makes only one side of the total cut, the wood at the center of the cut is usually torn away rather than cut and frequently causes jamming. Further, the chain saw operator usually uses a technique of dogging-in and prying-up to make the saw teeth bite and cut faster. The ideal chain saw tooth would cut the wood completely and cleanly, run smoothly without vibration and tend to be self-feeding into the cut.

The primary object of this invention therefore, is provide a kerf splitter integral with the cutting portion of a chain saw tooth and extending below the cutting edge thereof to make a groove along the center line of the complete cut and ensure proper separation of the wood chips.

Another object of this invention is to provide a saw chain tooth having an alignment and depth gauge which rides in the groove made by the kerf splitter and serves to stabilize the tooth and prevent lateral vibration and gouging.

Another object of this invention is to provide a chain saw tooth having a kerf splitter which tends to pull the tooth into the wood and makes the chain saw self-feeding.

A further object of this invention is to provide a saw chain tooth adaptable to existing chain assemblies and which can use various conventional cutting edge configurations.

Finally, it is an object to provide a saw chain tooth of the aforementioned character and which is simple and convenient to manufacture and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Figure 1:
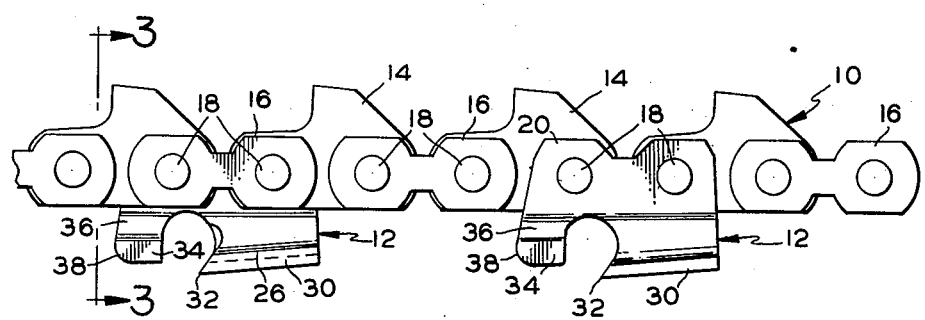
FIGURE 1 is a side elevation view of a portion of a saw chain.
Figure 2:
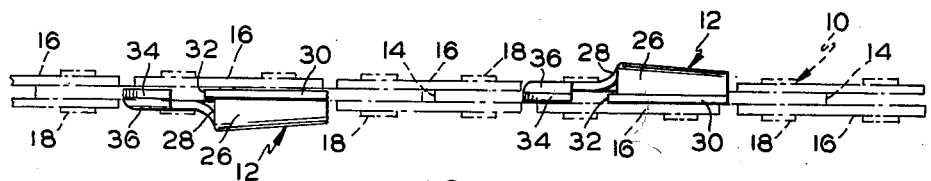
FIGURE 2 is a bottom view thereof.

As illustrated in FIGURES 1 and 2, the chain 10 is made up of a plurality of toothed cutting links 12 and drive links 14 joined by interconnecting links 16 and rivets 18 the arrangement being well known. The toothed cutting links 12 are made both right hand and left hand and are disposed alternately on opposite sides of the chain, each tooth thus cutting one half of the total cut which must be wide enough to allow free passage of the chain and its support bar, not shown.

Figure 4:
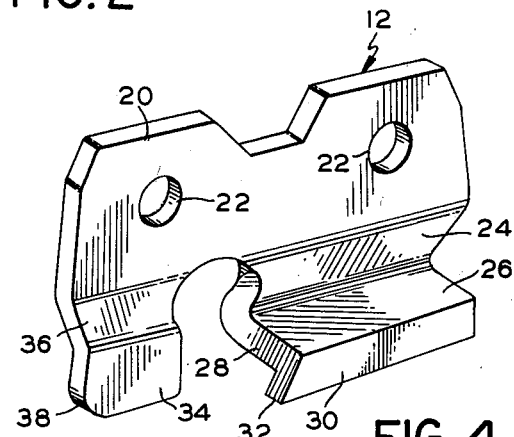
FIGURE 4 is a perspective view of one form of the tooth.

Each toothed cutting link 12 comprises a flat plate 20 having spaced holes 22 for the connecting rivets 18, as in FIGURE 4, the lower rear of said plate having an outwardly offset portion 24 at the lower edge of which is a generally flat blade 26 normal to the plane of the plate. The leading end of blade 26 has sharpened or bevelled cutting edge 28 which extends partially up the edge of offset portion 24, said blade being upwardly inclined and tapered in width longitudinally toward the rear for cutting clearance. Thus far the tooth is substantially conventional.

The inner edge of blade 26 has a downwardly turned flange which constitutes a kerf splitter 30, the forward end of which has a cutting point 32 which may be coplanar with the bevelled cutting edge 28. The kerf splitter 30 is disposed on the median plane of the chain and extends the full length of blade 26 and greatly adds to the strength thereof in addition to providing better tracking while cutting and positive directional rectilinear stability.

Figure 3:
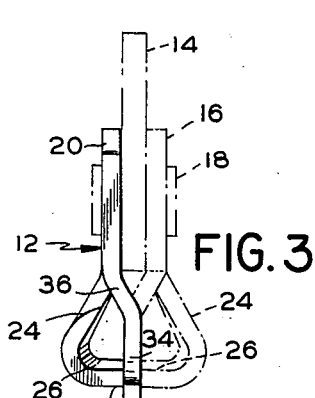
FIGURE 3 is an enlarged end view taken on line 3—3 of FIGURE 1.

Spaced forwardly of the blade 26 is a downwardly projecting depth gauge 34 coplanar with kerf splitter 30, as is FIGURES 2 and 3, and connected to plate 20 by an offset or joggled portion 36. The depth gauge 34 acts to control the depth of cut, as hereinafter described, and has a rounded forward lower nose 38 for smooth tracking, the lower edge of said depth gauge being substantially on a level with the lower face of blade 26, as in FIGURE 3.

Figure 7:
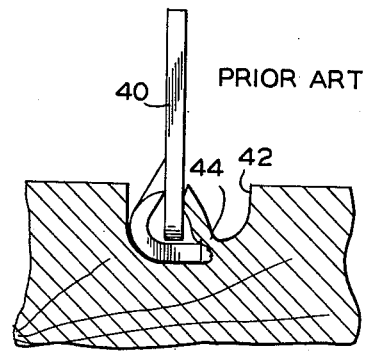
FIGURE 7 is a sectional view similar to FIGURE 6, showing the cutting action of a conventional tooth.

With reference to FIGURE 7, it can be seen that a conventional tooth 40 cuts one side of a complete cut 42, but along the center line of the cut the wood chips are not fully cut and are torn away, as indicated at 44. This often results in large, interconnected chips which clog the teeth and may cause jamming.

Figure 5:
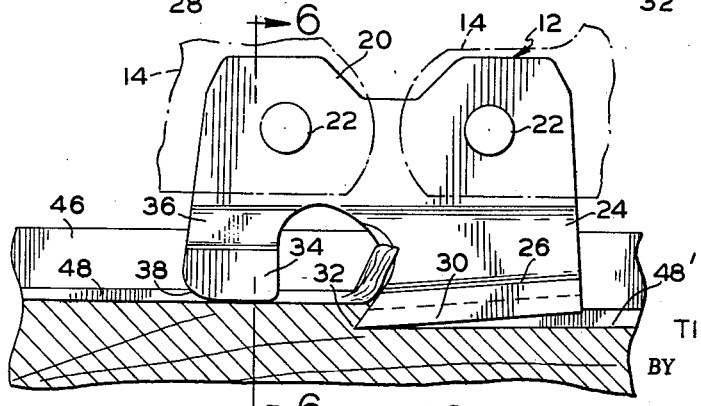
FIGURE 5 is an enlarged side view showing the cutting action of the tooth.
Figure 6:
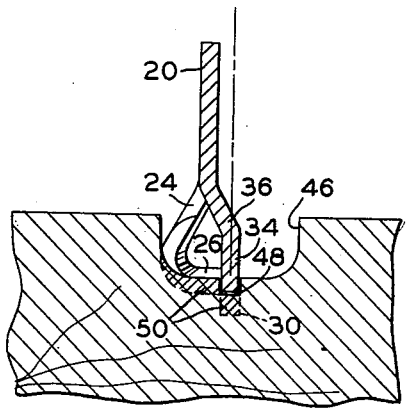
FIGURE 6 is a sectional view taken on line 6—6 of FIGURE 5.

In contrast, as illustrated in FIGURE 6, the toothed cutting link 12 removes the chips completely. The cutting edge 28 cuts the bottom and part of the side wall of one side of the cut 46, while the kerf splitter 30 makes a groove 48 along the center of the cut, which completely separates the chips at the center. The portion of wood about to be removed is indicated at 50 by double shading to show the extent of cut of a single tooth. With reference also to FIGURE 5, the depth gauge 34 rides in the groove 48 made by the kerf splitter of the preceding tooth, the kerf splitter 30 on the illustrated tooth 12 deepening the groove, as at 48′ for the alignment gauge of the following tooth. Thus each tooth is accurately tracked along the center line of cut by the depth gauge 34 riding the kerf splitting groove, which prevents lateral chattering and vibration of the chain. In addition, the forward rake of the kerf splitter point 32 tends to pull the blade 26 down into the wood with a self-feeding action, the depth of cut being limited by the alignment gauge 34 which bottoms in groove 48 and allows the blade to cut only to the bottom of the previously made groove, so that the chips are properly separated. This self-feeding obviates the need for the chain saw operator to dog-in the saw in order to make the teeth bite into the wood which, together with the lack of vibration, makes the operation easier and less tiring.

When commencing a cut, particularly in hard dry wood, the immediate entry of the kerf splitter 30, projecting below the cutting edge 28, tends to start the cut clearly without skidding or bouncing. This feature is also useful in boring operations where the end of the chain saw is advanced into the work. The extended kerf splitters start the cut cleanly, align the saw and pull the saw into the work.

Figure 8:
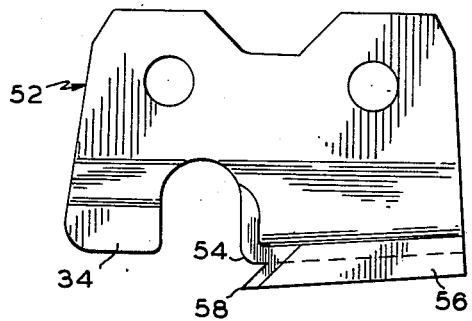
FIGURE 8 is a side view of an alternative form of the tooth.
Figure 9:
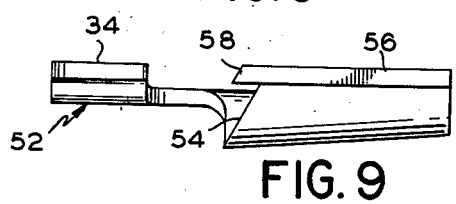
FIGURE 9 is a bottom view thereof.

The configuration is applicable to other types of teeth, such as the tooth 52 illustrated in FIGURES 8 and 9. The tooth 52 is substantially similar to that previously described, but the cutting edge 54 is swept back or inclined to the direction of cut, the kerf splitter 56 having a point 58 which conforms to the cutting edge. This type of tooth is desirable for certain types of work, but the inclined cutting edge tends to make the teeth pull outwardly. However, the combination of the kerf splitter and alignment gauge to align and track the teeth prevents any such side pull and greatly improves the cutting action.

Figure 10:
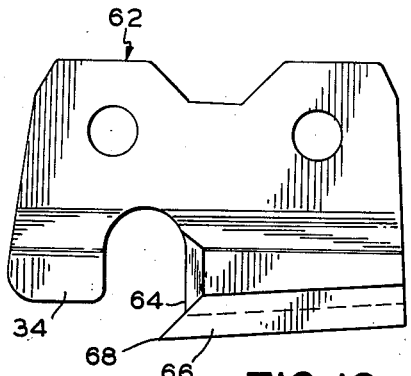
FIGURE 10 is a side view of a further alternative form of the tooth.
Figure 11:
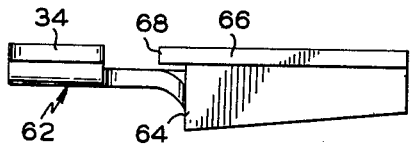
FIGURE 11 is a bottom view thereof.
Figure 12:
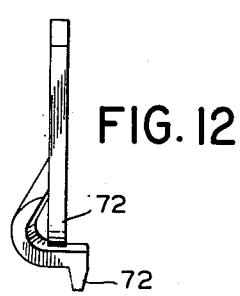
FIGURE 12 is an end view of a further form of the tooth.

A chisel type tooth 62 illustrated in FIGURES 10 and 11, in which the cutting edge 64 is substantially right angled and particularly suitable for soft woods, incorporates a kerf splitter 66 as before and the point 68 conforms to the cutting edge.

Where a manufacturer does not wish to offset the depth gauge the tooth may have a conventional depth gauge 70, as in FIGURE 12, which rides on the bottom of the cut rather than in the kerf splitter groove. The kerf splitter 72 may be tapered or radiused at the base in cross section if desired.

The kerf splitter adds very little to the manufacture of the tooth, which can be simply stamped from sheet material, as are many conventional teeth. No changes are necessary in the associated chain saw assembly. Vibration, skipping and wandering of the saw are greatly reduced, resulting in reduced wear on all parts of the saw and making the tool easier to operate. Cutting action is improved and the teeth are no more difficult to sharpen than conventional teeth, since in each case the kerf splitter point conforms to the actual cutting edge.

It is understood that minor variation from the form of the invention disclosed herein may be made without departure from the spirit and scope of the invention, and that the specification and drawings are to be considered as merely illustrative rather than limiting.

I claim:
1. In a chain saw having a plurality of links interconnected to form a flexible endless chain, cutting links comprising
   (a) a flat plate-like body portion,
   (b) a cutter extending from said body portion,
   (c) said cutter being curved outwardly and back transverse of the plane of the body portion to form a toe portion,
   (d) said cutter having its forward edge formed into a cutting edge,
   (e) said cutter further comprising a groove cutter extending from the end of said toe portion in a plane parallel to the general plane of the body portion,
   (f) and a depth gauge extending from the body portion in the same general plane as that of the groove cutter,
   (g) the depth gauge being located in a position on said body portion and extending therefrom a distance sufficient for it to ride in the groove formed by the groove cutter of the previous cutting link.

2. A chain saw comprising a plurality of cutting links interconnected by connecting links to form a flexible endless chain, said cutting links comprising:
   (a) a plate-like element,
   (b) a portion of said element having a blade substantially normal thereto ending in a toe,
   (c) the forward edge of said blade having a bevelled cutting edge,
   (d) a slotter extending from but integral with the end of the toe of said blade and lying in the median plane of said chain, the forward edge of said slotter being a cutting edge adapted to cut a slot in the bottom of the kerf cut by the blade, and
   (e) a depth gauge extending from said element and spaced forwardly of said blade, said depth gauge having an end portion which lies in the median plane of the chain and which is adapted to ride in the slot cut by the previous tooth.

References Cited in the file of this patent
UNITED STATES PATENTS

| | | |
|---|---|---|
| 2,564,989 | Ohman | Aug. 21, 1951 |
| 2,755,828 | Dunnington | July 24, 1956 |
| 2,862,533 | Mall | Dec. 2, 1958 |
| 2,989,096 | Irgens | June 20, 1961 |
| 3,066,711 | Winnlert et al. | Dec. 4, 1962 |